United States Patent [19]
Wechsler

[11] 3,947,754
[45] Mar. 30, 1976

[54] OPEN LOOP SERIES REGULATED POWER SUPPLY

[75] Inventor: Reuben Wechsler, Phoenix, Ariz.
[73] Assignee: Motorola, Inc., Chicago, Ill.
[22] Filed: June 3, 1974
[21] Appl. No.: 475,736

[52] U.S. Cl.......... 323/22 SC; 307/252 N; 318/227; 321/47
[51] Int. Cl.²............................................. G05F 1/56
[58] Field of Search........ 307/146, 252 N; 318/227, 318/345; 321/47, 40; 323/22 SC

[56] References Cited
UNITED STATES PATENTS

| | | | |
|---|---|---|---|
| 3,095,534 | 6/1963 | Cockrell | 323/22 SC X |
| 3,152,296 | 10/1964 | Meszaros | 323/22 SC |
| 3,244,965 | 4/1966 | Gutzwiller | 323/22 SC |
| 3,249,839 | 5/1966 | Fay | 318/345 X |
| 3,258,678 | 6/1966 | Legatti | 323/22 SC X |
| 3,335,291 | 8/1967 | Gutzwiller | 323/22 SC |
| 3,377,542 | 4/1968 | Glorioso | 323/22 SC X |
| 3,767,940 | 10/1973 | Herzog et al. | 323/22 SC X |
| 3,838,332 | 9/1974 | Hopengarten | 323/22 SC X |

*Primary Examiner*—William M. Shoop
*Attorney, Agent, or Firm*—Michael D. Bingham; Maurice J. Jones; Harry M. Weiss

[57] ABSTRACT

Two AC-DC regulator circuits are disclosed which are suitable for providing a constant minimal ripple DC supply voltage in response to AC line voltages having varying peak amplitudes. Each of the regulator circuits includes a sensing and a trigger pulse circuit which operates in cooperation with a current control circuit to maintain a predetermined constant DC load supply voltage. Moreover, undesirable transient trigger signals, due to initiation or termination of the AC line voltage, are discriminated against providing circuit protection to the applicable load to be used. The regulator circuits are suitable for operation in environments that may be encountered in worldwide applications, i.e., power distributions that may vary from 90 upwards to 250 volts with frequencies of 50 hertz to 60 hertz.

14 Claims, 4 Drawing Figures

OPEN LOOP SERIES REGULATED POWER SUPPLY

CROSS REFERENCE TO RELATED APPLICATIONS

The subject matter of the present application is related to the subject matter of a patent application entitled "Circuit For Converting Alternating Current Voltages To A Constant Magnitude Direct Current Voltage", Ser. No. 476,180, filing date June 4, 1974, filed by Jack R. Morgan, and a patent application entitled "An Alternating Current Voltage-To-Direct Current Voltage Regulator Circuit", Ser. No. 475,013, filing date May 31, 1974, filed by Reuben Wechsler, both applications are assigned to the present assignee.

BACKGROUND OF THE INVENTION

This invention relates to alternating current (AC) voltage to direct current (DC) voltage conversion circuits and particularly to circuits for regulating input voltages that have peak amplitudes which may vary for providing a constant magnitude, minimal ripple amplitude supply voltage. Due to the difference between power distribution systems employed by different nations, applied line voltages may vary from as low as 90 volts, as used in Japan, to as high as 250 volts, as encountered in Europe. In the United States there is about a 20 percent variation in the nominal voltage on a 120 volt line.

As a result of these voltage variations, a problem may be encountered by the international traveller having a small appliances, such as either an electric shaver or a radio, if the working voltage of the driving or power supply components in such appliances is exceeded. Some electric shavers contain bulky AC wound motors that are used to drive the shaver heads. Presently, it is sometimes necessary to manually switch the shaver to thereby tap a correct proportion of the motor windings in correspondence to the particular line voltage being used. The burden is on the user to see to it that this switching is properly performed in accordance with the different line voltages that may be encountered while travelling worldwide. If the traveller does not correct for a specific line voltage, the shaver motor may be destroyed by excessive currents.

The AC motor referred to in the previous paragraph also presents a production disadvantage in the manufacture of the electric shaver. By nature, AC motors are bulky and expensive. It is, therefore, desired to use small inexpensive direct current motors with permanent magnet fields requiring minimum working voltage. An AC regulator circuit capable of providing a high degree of regulation with varying amplitudes of input line voltage is required to facilitate the use of such DC motors.

Although present AC-DC regulators are adequate for regulating input voltages that have amplitudes that vary from 10 to 20 percent, these regulators are not suitable to be used in small appliances in which the peak amplitude of the input line voltage may vary more than 100 percent. To maintain nominal working voltages of 100 volts in environments having line voltages with amplitudes of 250 volts, present regulators generally have to conduct current of large magnitudes. To withstand the resulting power dissipation, it is necessary to use high power semiconductor devices and heat sinking to provide protection to such devices. This undesirably increases the physical size of such regulators. Moreover, power devices are expensive and provide disadvantages in a marketing environment that demands minimal production costs.

Another problem common to most present regulators is that of transients. Transient voltages can occur during either connection or disconnection of the regulator to or from the line voltage supply. If the transient voltage causes a false triggering signal to occur simultaneously with the peak value of the applied line voltage, the output voltage of the regulator may exceed the rating of the motor and destroy it.

Thus, a need exists for a regulator circuit providing a constant output voltage and which is operable in environments in which extreme amplitude variances in line voltages occur and which does not require manual switching techniques to protect the circuit. A need also exists to develop a regulator circuit which is not damaged by false triggering in response to transients.

SUMMARY OF THE INVENTION

It is an object of this invention to provide an improved AC-DC regulator circuit.

Another object is to provide a regulator circuit which is responsive to AC line voltages having peak amplitudes which vary from 90 to 250 volts to provide a minimum ripple output voltage having a constant predetermined magnitude.

A further object is to provide a regulator circuit which discriminates against voltage transients.

A still further object is to provide a regulator circuit which is suitable for being included in small appliances having DC motors requiring constant supply voltages.

The regulator circuit structures of the invention are suitable for providing a direct current (DC) output voltage of a predetermined magnitude in response to alternating current (AC) input voltages that may have varying peak amplitudes. Moreover, a regulator circuit is described that discriminates against false triggering signals that are caused by transient conditions to thereby prevent output voltage excursions of sufficient magnitude to damage the circuit load. The regulator circuit structures include a control circuit which provides a direct current output voltage across a load in response to the negative slopes of an alternating current voltage supply.

The control circuit comprises a detecting circuit connected to the alternating current voltage supply for sensing the negative slopes of the alternating current voltage and providing a control signal at an output terminal thereof. A switching circuit is connected to the output terminal of the detecting circuit and to the alternating current voltage supply and provides a direct current voltage of constant magnitude in response to the control signal and alternating current voltage supply.

DETAILED DESCRIPTION OF THE PREFERRED EMBODIMENT

Figure 1:
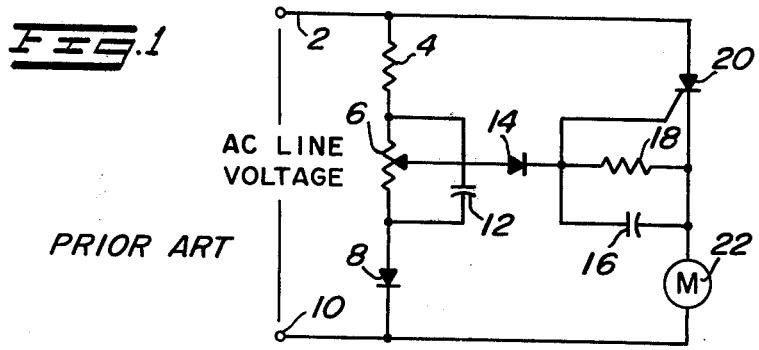
FIG. 1 is a schematic diagram illustrating a series regulator circuit which is well known in the art.

A prior art regulator circuit will be described along with some of the problems therewith so that the advantages of the regulator circuit structures of the present invention can be more fully appreciated. Referring to FIG. 1, there is shown a prior art half-wave thyristor series regulator circuit. Only the positive half cycle of the applied alternating current line voltage at terminals 2 and 10 is utilized by this circuit. This is because diode 8, which is connected in series with variable resistor 6 and resistor 4; is reverse biased during the negative half cycle. Capacitor 12 is connected in parallel across the variable resistor 6 to complete a reference voltage circuit.

The line voltage, which is developed across terminals 2 and 10, is also supplied to the output portion of the regulator circuit that includes SCR 20 which is connected in series with the d.c. motor load 22. The gate of SCR 20 is connected to the cathode of SCR 20 through resistor 18 and capacitor 16. Triggering action of SCR 20 is accomplished through diode 14 which is interposed between the movable contact of resistor 6 and the gate of SCR 20.

The prior art regulator circuit of FIG. 1 operates by comparing the motor voltage across capacitor 16 with a reference voltage obtained at the movable contact resistor 6. More specifically, if during the positive half cycle of applied line voltage, the motor is loaded such that the voltage magnitude across capacitor 16 is less than the generated reference voltage magnitude, diode 14 will conduct thereby turning SCR 20 on. SCR 20 will remain conductive until such time that the motor voltage magnitude across capacitor 16 equals the generated reference voltage thereby turning diode 14 off, eliminating gate current flow and turning SCR 20 off. The circuit of FIG. 1 supplies the correct energy to the motor load by recharging capacitor 16 only during the positive half cycle of the applied line voltage.

The above described prior art regulator circuit is not capable of providing a constant d.c. output voltage in environments wherein the a.c. line voltage may vary in amplitude from 90 to 250 volts. As the applied line voltage increases, the voltage applied to the motor will also increase due to the charging of capacitor 16, thereby possibly damaging the motor.

Another fault inherent in the previously described prior art regulator circuit is that of false triggering. With capacitor 16 initially uncharged, the peak positive value of the applied line voltage will cause gate current to flow through diode 14 charging capacitor 16 to the full peak value thereby possibly damaging the motor.

Figure 2:
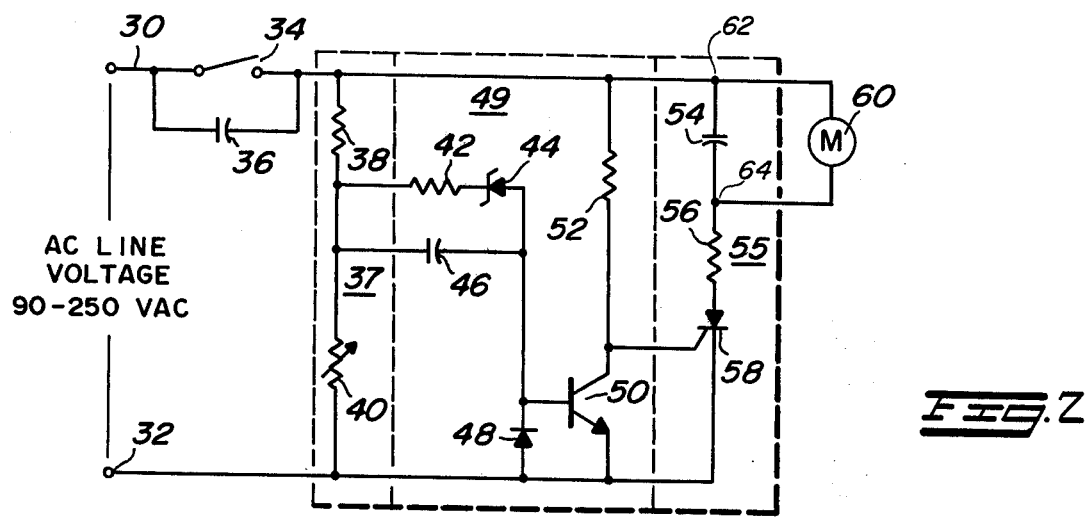
FIG. 2 is a schematic diagram illustrating the open loop series regulator circuit of one embodiment of the invention.

FIG. 2 illustrates an open loop AC-DC series regulator of one embodiment of the invention which eliminates the preceding problems. The AC line voltage which may vary from 90 to 250 volts in peak amplitude is supplied to the regulator circuit of FIG. 2 through switch 34. The resistive divider network consisting of resistor 38 is connected in series with variable resistor 40 to form a reference voltage circuit. The applied line voltage is also supplied to a regulating circuit, comprising filter capacitor 54, which is connected in series to limiting resistor 56. Resistor 56 is connected to the anode of SCR 58. The cathode of SCR 58 is connected to terminal 32.

SCR 58 is turned on by the gate triggering circuit which is the third basic circuit portion of the series regulator of FIG. 2. The gate triggering circuit consists of resistor 42 connected to the cathode of zener diode 44 with the anode of zener diode 44 connected to the base of transistor 50. The collector of transistor 50 is coupled to the AC line voltage through resistor 52 and to the gate of SCR 58. The emitter of transistor 50 is connected to input terminal 32 which is the ground reference terminal for the regulator circuit. The base of transistor 50 is connected to terminal 32 through diode 48. Capacitor 46 is connected between the anode of zener diode 44 and resistor 42. The resistor 42 and capacitor 46 are connected to the reference voltage circuit at the node between resistors 38 and 40. Output terminals 62 and 64 of the regulator circuit are adapted to be connected to an appropriate load such as motor load 60.

Figure 4:
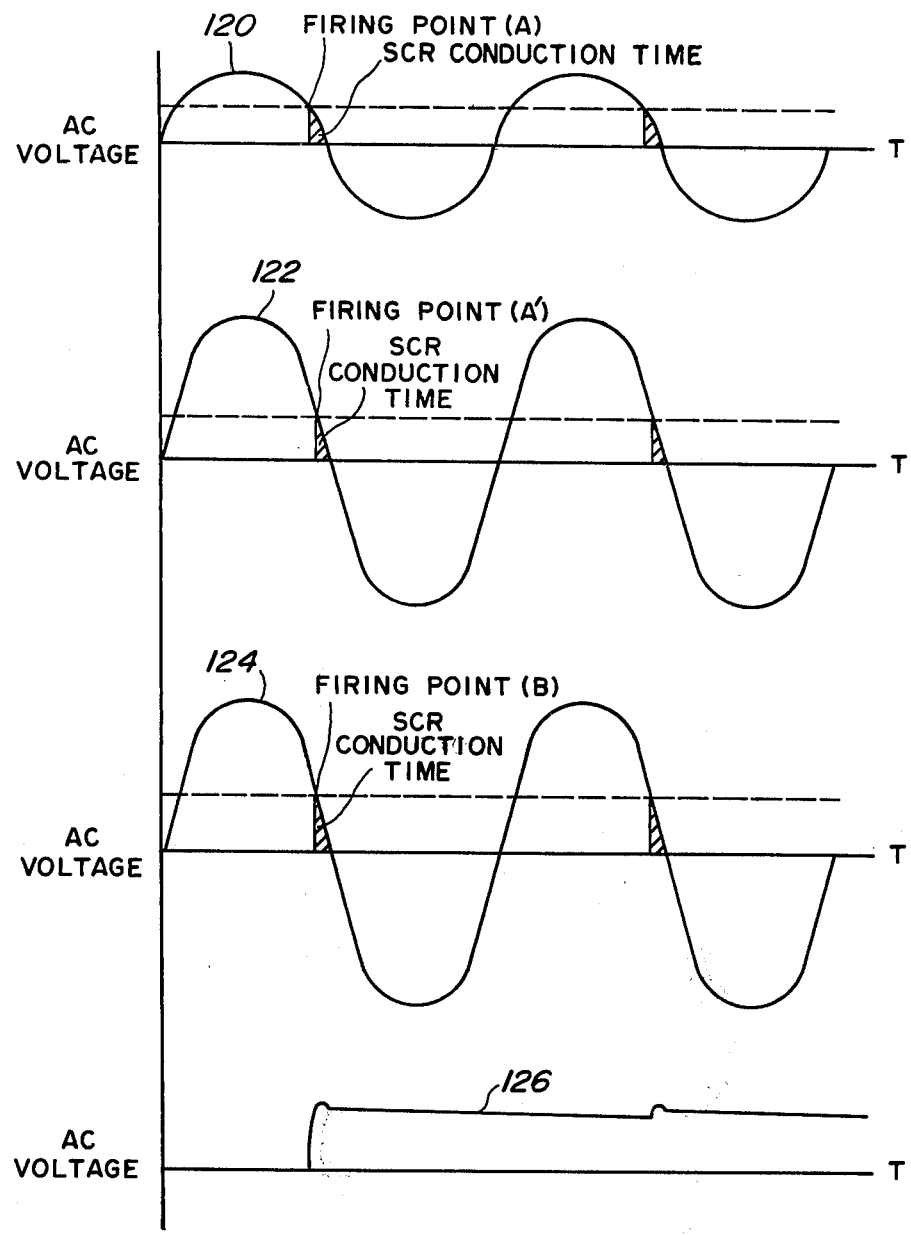
FIG. 4 shows waveforms useful in understanding the functioning of the regulator circuits.

The operation of the regulator of FIG. 2 is explained with the aid of FIG. 4. In response to the closing of switch 34, the line voltage is supplied to the reference voltage circuit, comprising the resistive divider network of resistors 38 and 40, and to the collector of transistor 50 through coupling resistor 52. If it is assumed that the supplied line voltage is at the beginning of its positive half cycle, current flows through capacitor 46 to the base of transistor 50 thereby rendering transistor 50 conductive which shunts the regulator portion of the circuit. This action continues until the value of the positive half cycle voltage is such that zener breakover voltage of diode 44 is reached thereby causing zener breakdown to occur. Current is then supplied to the base of transistor 50 through resistor 42 and zener diode 44. Transistor 50 thereby remains on and continues to shunt the regulator portion of the circuit.

When the voltage developed across capacitor 46 becomes equal in magnitude to the open circuit reference voltage developed across resistor 40, current ceases to flow into the base of transistor 50, thereby turning transistor 50 off. With transistor 50 in an off condition, current is then supplied through resistor 52 to the gate of SCR 58 turning it on. Capacitor 54 is charged by the current flowing through coupling resistor 56 and SCR 58. This action continues until capacitor 54 is charged to a desired magnitude of working voltage. The voltage developed across capacitor 54 is then applied to motor load 60 through output terminals 62 and 64.

As the applied line voltage becomes negative, capacitor 54 is kept from charging by SCR 58, which is in a reverse biased condition. Diode 48 shunts the complete portion of the negative half cycle of the line voltage away from the emitter-base junction of transistor 50 thereby protecting the emitter-base junction from reaching a reverse junction breakdown voltage.

By adjusting resistor 40, SCR 58 is caused to conduct only during the declining portion of the positive half cycle of the input line voltage, corresponding to a negative slope, thereby charging capacitor 54 only during that time that the magnitude of the working voltage of the motor will not be exceeded by an amount sufficient to destroy it. Capacitor 54 is of the correct size allowing it to be supplied enough energy during the SCR 58 conduction time such that a minimal ripple DC output voltage is maintained across motor load 60, as shown by waveform 126 of FIG. 4.

Waveforms 120, 122 and 124 of FIG. 4 illustrate three specific examples of line voltage inputs corresponding with the related SCR conduction times indicated. By examining waveforms 120 and 122, it is seen that if the firing point of SCR 58 is kept constant, that the actual SCR conduction time is less during conditions of high input line voltages as compared to lower input voltages. Therefore the energy supplied to capacitor 54 is less which causes the working voltage magnitude to be smaller under conditions of maximum supplied line voltage. A remedy to the aforementioned problem is to allow SCR 58 to conduct earlier in the positive half cycle of applied line voltage, as shown in waveform 24. Under these conditions enough energy will be supplied to capacitor 54 so that over extreme line voltage variations a minimal ripple DC voltage will be seen at the output terminals of the regulator circuit. Resistor 42 of the gate triggering circuit provides this variable firing point to SCR 58 causing capacitor 46 to charge to a higher voltage at high AC line voltages than at low AC line voltages. Therefore, gate triggering current flows earlier in the positive half cycle turning SCR 58 on earlier. Capacitor 54 therefore has more energy supplied to it, which provides for a more constant output voltage. Circuit regulation is provided over input voltage ranges of 90 to 250 volts.

Figure 3:
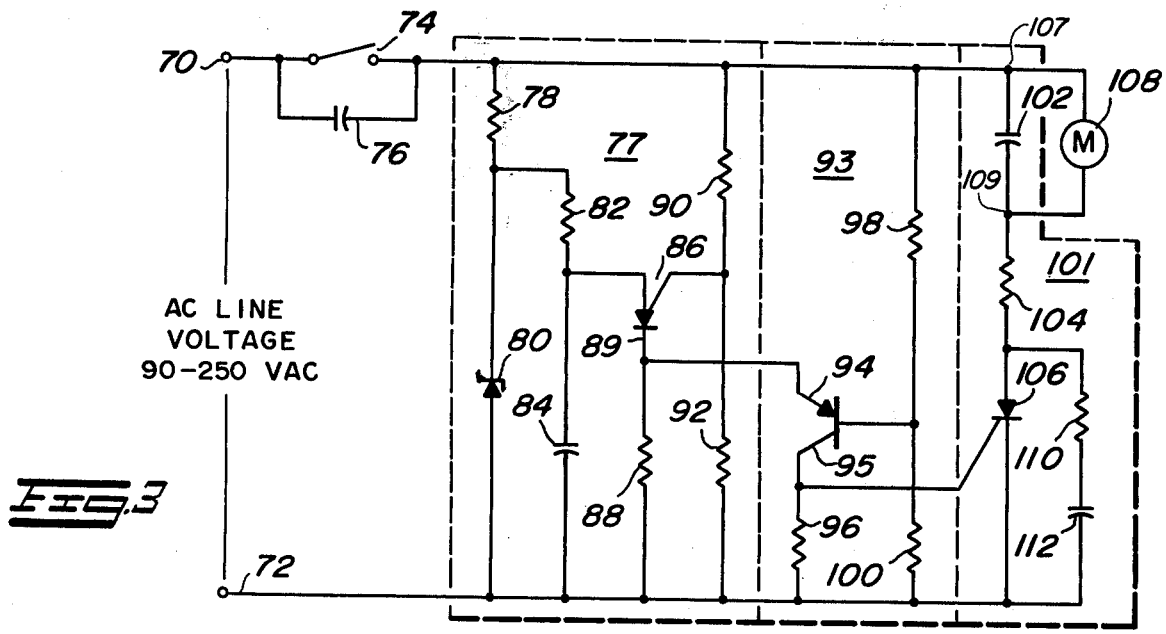
FIG. 3 is a schematic diagram illustrating yet another series regulator circuit of another embodiment of the invention.

Referring to FIG. 3, another embodiment of the invention is shown that provides protection against false firing problems that occur in prior art circuits. As in the description of the first embodiment of the invention, the AC-DC regulator shown in FIG. 3 can be partitioned into the three functional circuits: gate voltage sensing circuit 77, a gate signal comparator and triggering circuit 93, and a DC regulated output voltage circuit 101.

The AC line voltage at input terminals 70 and 72 is applied to the regulator circuit by the closing of switch 74. Resistor 78 and zener diode 80 are connected in series in that order between switch 74 and input terminal 72. Resistor 82 and capacitor 84 are connected in series between the midpoint of the connection of resistor 78 and zener diode 80 and terminal 72. Resistors 78, 82, zener diode 80 and capacitor 84 comprise a voltage translation circuit deriving a linear ramp voltage with an output provided at the junction between resistor 82 and capacitor 84 which is connected to the anode of programmable unijunction transistor 86. The cathode of programmable unijunction transistor 86 is connected to terminal 72 through coupling resistor 88. A resistive divider network consisting of resistor 90 connected in series with resistor 92 is interposed between switch 74 and input terminal 72, and which includes a variable voltage comparison circuit. The gate of programmable unijunction transistor 86 is connected to the node between resistors 90 and 92. A gate trigger voltage that appears across resistor 88 at output terminal 89 is applied to the emitter of transistor 94. The collector of transistor 94 is returned to input terminal 72 through coupling resistor 96. A second resistive divider network including resistor 98 connected in series with resistor 100 is connected between switch 74 and input terminal 72 and provides another variable comparison voltage. The voltage developed across resistor 100 is applied to the base of transistor 94. The gate trigger voltage is compared by transistor 94 with the reference voltage appearing at the node between resistors 98 and 100. If the gate trigger pulse has sufficient magnitude, a gate control voltage is developed across resistor 96 at output terminal 95. Terminal 95 is connected to the gate of SCR 106. The cathode of SCR 106 is connected to input terminal 72. Filter capacitor 102 is connected in series between switch 74 and the anode of SCR 106 through coupling resistor 104. An RC snubber circuit consisting of resistor 110 in series with capacitor 112 is connected in parallel between the anode and cathode of SCR 106. The output of the regulator is taken at output terminals 107 and 109 thereof providing a minimal ripple DC constant voltage to motor 108.

The above described circuit responds to an AC voltage supply that may vary in amplitude from 90 to 250 volts and provides a DC voltage output of constant magnitude. The aforementioned regulation is obtained by varying the conduction time of SCR 106 in accordance to the magnitude of the input AC voltage. SCR 106 conducts earlier in the positive half cycle of low input voltages than for high input voltages thereby supplying energy to capacitor 102 of sufficient quantity to maintain a constant voltage across capacitor 102 plates which are adapted to be connected at output terminals 107 and 109.

The conduction time of SCR 106 is caused to vary by the functions of gate voltage sensing circuit 77 and gate signal comparator circuit 93 in the following manner. Responding to the closing of switch 74, the AC input voltage is applied to a fixed reference voltage circuit including resistor 78 and zener diode 80. A linear ramp voltage is derived across capacitor 84 from a RC ramp circuit comprising resistor 82 and capacitor 84. An approximately linear ramp voltage is obtained across capacitor 84 by using a relatively high voltage zener diode 80 which develops a fixed magnitude of voltage at the input of the RC ramp circuit. The ramp voltage developed across capacitor 84 is then applied to anode of programmable unijunction transistor 86. Simultaneously, a variable reference voltage is derived by dividing the applied input voltage by using a voltage divider circuit comprising resistors 90 and 92. The variable reference voltage developed at the node between resistors 90 and 92 is applied to the gate of programmable unijunction transistor 86. The magnitude of the voltage at the anode of programmable unijunction transistor 86 is compared to the magnitude of the voltage developed at the gate of programmable unijunction transistor 86 causing programmable unijunction transistor 86 to conduct at the desired level of the positive half cycle of the applied input voltage. As programmable unijunction transistor 86 conducts a gate triggering pulse is developed across resistor 88 at terminal 89. Simultaneously, a second variable reference voltage is developed at the node between resistors 98 and 100 from the applied input voltage and is coupled to the base of transistor 94. If the magnitude of the gate triggering pulse coupled to the emitter of transistor 94 is positive with respect to the magnitude of the second variable reference voltage, transistor 94 is rendered conductive. As transistor 94 conducts, gate current is supplied to SCR 106. SCR 106 then conducts during the correct portion of the positive half cycle of the input voltage causing current to flow through capacitor 102. Thus, the desired output voltage is developed across capacitor 102 and is applied to output terminals 107 and 109.

As the applied input voltage begins its negative half cycle, zener diode 80 becomes forward biased and thereby shunts the input voltage away from the regulator circuit. Capacitor 102 must be a value such that sufficiently little discharge occurs through motor 108 during the negative half cycle of the input voltage. By selecting the correct value for capacitor 102, a constant DC voltage is obtained at output terminals 107 and 109.

The comparator circuit consisting of transistor 94 and resistors 98 and 100 insures against false triggering of SCR 106. If a triggering pulse should be generated by programmable unijunction transistor 86 earlier in the positive half cycle than intended, as a result of transient conditions such as switch or plug contact "bounce", capacitor 84 does not have sufficient time to charge to a voltage magnitude which would would normally be attained at the particular line voltage being utilized. As a result, the gate trigger pulse appearing at terminal 89 is not of sufficient magnitude to be passed to the gate of SCR 106 by the comparator circuit, and false triggering is therefore prevented.

Resistor 110 and capacitor 112 were selected such that the resulting time constant is consistent with the charging rate of capacitor 102, so that as SCR 106 conducts, capacitor 102 can be fully charged and at the same time limiting the rate of voltage rise across SCR 106 thereby inhibiting false firing of SCR due to $dV/dT$ modes.

Several salient improvements over prior art regulators are accomplished by the embodiments of this invention. The AC-DC regulating circuits described herein require less power dissipation reducing their cost. Satisfactory regulation is also obtained from input line voltages that may vary from 90 to 250 volts in their peak amplitudes without requiring the need for manual adjustment, and false triggering of SCr 106 is restrained thereby providing protection to the regulator load.

While the above detailed description has shown and described the fundamental novel features of the embodiments of the invention, it will be apparent to those skilled in the art that many changes and modifications may be made without departing from the spirit of the invention.

I claim:

1. An alternating current voltage to direct current voltage regulator circuit suitable for providing a constant direct current regulated output voltage at output terminals thereof in response to an input alternating current voltage of varying peak-to-peak amplitudes applied to input terminals comprising:
    voltage reference means receiving the alternating current voltage and providing a gating reference voltage;
    gating means connected to said voltage reference means and to the alternating current voltage and receiving said gating reference voltage and developing a triggering signal;
    regulator means connected to said gating means and receiving said triggering signal and the alternating current voltage for deriving a regulated and constant direct current voltage at said output terminals thereof;
    said triggering signal occuring at substantially a constant magnitude of said alternating circuit voltage.

2. The alternating current voltage to direct current voltage regulator circuit of claim 11 wherein said gating means includes in combination:
    first electron control means having first and second electrodes;
    second electron control means having first, second and third electrodes, said first electrode being connected to one of said input terminals of said regulator circuit said second electrode being connected to said second electrode of said first electron control means;
    first circuit means coupling said gating reference voltage to said first electrode of said first electron control means;
    second circuit means also connecting said gating reference voltage to said second electrode of said second electron control means;
    third electron control means having first and second electrodes, said first electrode being connected to said second electrode of said second electron control means, said second electrode being connected to said first electrode of said second electron control means; and
    third circuit means coupling the alternating current voltage from the other of said input terminals to said third electrode of said second electron control means.

3. The alternating current voltage to direct current voltage regulator of claim 2 wherein said regulator means includes in combination:
    fourth electron control means having first, second and third electrodes, said first electrode being connected to said first electrode of said second electrol control means, said second electrode being connected to said third electrode of said second electron control means;
    fourth circuit means having first and second leads, said second lead being connected to said third electrode of said fourth electron control means; and
    filter means connected to said other input terminal of the regulator circuit and to said first lead of said fourth circuit means.

4. The alternating current voltage to direct current voltage regulator of claim 3, wherein:
    said first electron control means comprises a zener diode;
    said second electron control means comprises a bipolar transistor of one conductivity type; and
    said fourth electron control means comprises a silicon controlled rectifier.

5. An open loop regulator circuit suitable for providing a substantially constant output voltage to a load at output terminals thereof in response to an alternating power signal being applied at input terminals, said alternating power signal having peak amplitudes which may vary in magnitude, said regulator circuit comprising:
    means responsive to said applied alternating power signal for providing a triggering signal at an output terminal thereof of a predetermined and substantially constant voltage magnitude of said alternating power signal, said triggering signal occurring during the portion of the cycle of said alternating power signal having a negative slope;
    first capacitive means having first and second terminals, said first terminal being coupled to one of said input terminals and one of said output terminal of said regulator circuit, said second terminal being connected to the other of said output terminals of said regulator circuit; and
    means responsive to said triggering signal for charging said capacitive means such that a predetermined and substantially constant voltage is maintained across said capacitive means to permit a constant voltage to be applied to said load, said charging means being connected between said second terminal of said capacitive means and the other of said input terminals of said regulator circuit.

6. The regulator circuit of claim 5 wherein said means for providing a triggering signal includes:
a variable voltage reference means coupled between said input terminals of said regulator circuit for providing a voltage signal at an output terminal which is related to the voltage of said alternating power signal but which is reduced in magnitude;
first circuit means for providing a driving current signal in response to said voltage signal from said variable voltage reference means until such time that said predetermined voltage magnitude of said alternating power signal is reached at which time said driving current signal is caused to decrease to zero, said first current means having an input terminal and an output terminal, said input terminal being connected to said output terminal of said variable voltage reference means;
second circuit means having first and second terminals, said first terminal being coupled to said one of said input terminals of said regulator circuit; and
first electron control means having first, second and control electrodes, said first electrode being connected to said other input terminal of said regulator circuit, said second electrode being connected to said second terminal of said second circuit means, said control electrode being coupled to said output terminal of said first circuit means and said other input terminal of said regulator circuit, said first electron control means being rendered conductive by said driving current signal and being rendered nonconductive when said driving current signal is caused to decrease to zero such that said triggering signal is derived at said second electrode of said first electron control means only when said first electron control means is rendered nonconductive.

7. The regulator circuit of claim 6 wherein said first circuit means includes:
second capacitive means connected between said output terminal of said variable voltage reference means and said output terminal of said first circuit means;
first resistive means having first and second terminals, said first terminal being connected to said output terminal of said variable voltage reference means; and
a zener diode coupled between and second terminal of said first resistive means and said output terminal of said first circuit means.

8. The regulator circuit of claim 6 wherein said charging means includes:
second electron control means having first, second and control electrodes, said control electrode being adapted to receive said triggering signal and first electrode being coupled to said other input terminal of said regulator circuit; and
third circuit means connected between said second terminal of said capacitive means and said second electrode of said second electron control means.

9. The regulator circuit of claim 8 wherein:
said first electron control means includes a bipolar transistor; and
said second electron control means includes a silicon controlled rectifier.

10. The regulator circuit of claim 5 wherein said means for providing a triggering signal includes:
voltage translation circuit means for deriving a linear ramp voltage signal at an output terminal thereof, said voltage translation circuit means being coupled between said input terminals of said regulator circuit;
first variable voltage reference means coupled between said input terminals of said regulator circuit for deriving a first reference voltage signal at an output terminal thereof which is reduced in magnitude but which is related to the voltage of said alternating power signal;
comparator means responsive to said linear ramp voltage signal from said voltage translation circuit means and said first reference voltage signal from said first variable voltage reference means for providing a voltage control signal at an output terminal thereof in response to the magnitude of said linear ramp voltage signal being substantially equal to or greater than the magnitude of said first reference voltage signal, said comparator means being coupled to said other input terminal of said regulator circuit;
second variable voltage reference means coupled between said input terminals of said regulator circuit for providing a second reference voltage signal at an output terminal thereof; and
first electron control means having first, second and control electrodes for deriving said triggering signal in response to the magnitude of said voltage control signal being greater than the magnitude of said second reference voltage signal, said first electrode being coupled to said output terminal of said comparator means, said second electrode being coupled to said other input terminal of said regulator circuit and to said output terminal of said means for providing a triggering signal, said control electrode being coupled to said output terminal of said second variable voltage reference means.

11. The voltage regulator circuit of claim 10 wherein:
said voltage translation circuit means includes a zener diode coupled between said input terminals of said regulator, a ramp circuit connected between one electrode of said zener diode, said other terminal of said regulator circuit and said output terminal of said voltage translation circuit means; and
said comparator means includes a second electron control means having anode, gate and cathode electrodes, said anode electrode being adapted to receive said linear ramp voltage signal, said gate electrode being adapted to receive said first reference voltage signal.

12. The rgulator circuit of claim 11 wherein said charging means includes third electron control means being rendered conductive in response to said triggering signal, said third electron control means having first, second and control electrodes, said control electrode being coupled to said second electrode of said first electron control means, said first electrode being coupled to said other input terminal of said regulator circuit, said second electrode being coupled to said second terminal of said first capacitive means.

13. The regulator circuit of claim 11 wherein said charging means further includes circuit means connected between said first and second electrodes of said third electron control means for inhibiting false triggering of said third electron control means, said circuit means comprising a resistor and a capacitor.

14. The regulator circuit of claim 13 wherein:
said first electron control means includes a bipolar transistor;
said second electron control means includes a programmable unijunction transistor; and
said third electron control means includes a silicon controlled rectifier.

* * * * *